(12) United States Patent
Ekstrand et al.

(10) Patent No.: US 9,328,285 B2
(45) Date of Patent: May 3, 2016

(54) METHODS USING LOW CONCENTRATIONS OF GAS BUBBLES TO HINDER PROPPANT SETTLING

(75) Inventors: Barry Ekstrand, Katy, TX (US); Frank Zamora, San Antonio, TX (US); Sarkis R. Kakadjian, San Antonio, TX (US)

(73) Assignee: Weatherford Technology Holdings, LLC

( * ) Notice: Subject to any disclaimer, the term of this patent is extended or adjusted under 35 U.S.C. 154(b) by 46 days.

(21) Appl. No.: 12/416,984

(22) Filed: Apr. 2, 2009

(65) Prior Publication Data

US 2010/0252262 A1    Oct. 7, 2010

(51) Int. Cl.
*E21B 43/267* (2006.01)
*E21B 21/08* (2006.01)
*C09K 8/70* (2006.01)

(52) U.S. Cl.
CPC ............... *C09K 8/70* (2013.01); *E21B 43/267* (2013.01)

(58) Field of Classification Search
CPC ....... C09K 8/80; E21B 21/08; E21B 41/0078; E21B 43/267; E21B 43/26
USPC ............ 166/280.1, 300, 305.1, 308.1–308.3, 166/309; 507/202
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 60/72 |
| 2,838,116 A * | 6/1958 | Clark, Jr. et al. | 166/308.1 |
| 3,059,909 A | 10/1962 | Wise | 261/39.3 |
| 3,100,528 A * | 8/1963 | Plummer et al. | 166/303 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,399,727 A * | 9/1968 | Graham et al. | 166/280.1 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,980,136 A * | 9/1976 | Plummer et al. | 166/280.1 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |

(Continued)

FOREIGN PATENT DOCUMENTS

| | | | |
|---|---|---|---|
| CA | 2007965 | 8/1990 | C10G 29/20 |
| CA | 2125513 | 1/1995 | |

(Continued)

OTHER PUBLICATIONS

U.S. Appl. No. 12/075,461, Gatlin et al.

(Continued)

*Primary Examiner* — Catherine Loikith
(74) *Attorney, Agent, or Firm* — Robert W. Strozier

(57) ABSTRACT

Methods for reducing settling rates of proppants in fracturing fluids include injecting sufficient gas into the fluid to form bubbles that reduce proppant settling rates. Compositions including proppants made buoyant with gas bubbles.

22 Claims, 2 Drawing Sheets

(56) References Cited

U.S. PATENT DOCUMENTS

| | | | | |
|---|---|---|---|---|
| 4,108,782 A | 8/1978 | Thompson | | 507/205 |
| 4,112,050 A | 9/1978 | Sartori et al. | | 423/223 |
| 4,112,051 A | 9/1978 | Sartori et al. | | 423/223 |
| 4,112,052 A | 9/1978 | Sartori et al. | | 423/223 |
| 4,113,631 A | 9/1978 | Thompson | | 507/202 |
| 4,378,845 A | 4/1983 | Medlin et al. | | 166/297 |
| 4,461,716 A | 7/1984 | Barbarin et al. | | 252/307 |
| 4,479,041 A | 10/1984 | Fenwick et al. | | 200/81 R |
| 4,506,734 A | 3/1985 | Nolte | | 166/308.1 |
| 4,514,309 A | 4/1985 | Wadhwa | | 507/211 |
| 4,541,935 A | 9/1985 | Constien et al. | | 507/225 |
| 4,549,608 A | 10/1985 | Stowe et al. | | 166/280.1 |
| 4,561,985 A | 12/1985 | Glass, Jr. | | 507/108 |
| 4,623,021 A | 11/1986 | Stowe | | 166/250.1 |
| 4,627,495 A * | 12/1986 | Harris et al. | | 166/280.1 |
| 4,654,266 A | 3/1987 | Kachnik | | 428/403 |
| 4,657,081 A | 4/1987 | Hodge | | 166/380.5 |
| 4,660,643 A | 4/1987 | Perkins | | 166/283 |
| 4,683,068 A | 7/1987 | Kucera | | 507/201 |
| 4,686,052 A | 8/1987 | Baranet et al. | | 507/244 |
| 4,695,389 A | 9/1987 | Kubala | | 507/244 |
| 4,705,113 A | 11/1987 | Perkins | | 166/302 |
| 4,714,115 A | 12/1987 | Uhri | | 166/308.1 |
| 4,718,490 A | 1/1988 | Uhri | | 166/281 |
| 4,724,905 A | 2/1988 | Uhri | | 166/250.1 |
| 4,725,372 A | 2/1988 | Teot et al. | | 507/129 |
| 4,739,834 A | 4/1988 | Peiffer et al. | | 166/308.4 |
| 4,741,401 A | 5/1988 | Walles et al. | | 166/300 |
| 4,748,011 A | 5/1988 | Baize | | 423/228 |
| 4,779,680 A | 10/1988 | Sydansk | | 166/300 |
| 4,795,574 A | 1/1989 | Syrinek et al. | | 507/238 |
| 4,817,717 A | 4/1989 | Jennings, Jr. et al. | | 166/278 |
| 4,830,106 A | 5/1989 | Uhri | | 166/250.1 |
| 4,846,277 A | 7/1989 | Khalil et al. | | 166/280.1 |
| 4,848,468 A | 7/1989 | Hazlett et al. | | 166/300 |
| 4,852,650 A | 8/1989 | Jennings, Jr. et al. | | 166/250.1 |
| 4,869,322 A | 9/1989 | Vogt, Jr. et al. | | 166/280.1 |
| 4,892,147 A | 1/1990 | Jennings, Jr. et al. | | 166/280.2 |
| 4,926,940 A | 5/1990 | Stromswold | | 166/247 |
| 4,938,286 A | 7/1990 | Jennings, Jr. | | 166/280.1 |
| 4,978,512 A | 12/1990 | Dillon | | 423/226 |
| 5,005,645 A | 4/1991 | Jennings, Jr. et al. | | 166/280.1 |
| 5,024,276 A | 6/1991 | Borchardt | | 166/308.6 |
| 5,067,556 A | 11/1991 | Fudono et al. | | 62/196.4 |
| 5,074,359 A | 12/1991 | Schmidt | | 166/280.1 |
| 5,074,991 A | 12/1991 | Weers | | 208/236 |
| 5,082,579 A | 1/1992 | Dawson | | 507/211 |
| 5,106,518 A | 4/1992 | Cooney et al. | | 507/21 |
| 5,110,486 A | 5/1992 | Manalastas et al. | | 507/260 |
| 5,169,411 A | 12/1992 | Weers | | 44/421 |
| 5,224,546 A | 7/1993 | Smith et al. | | 166/300 |
| 5,228,510 A | 7/1993 | Jennings, Jr. et al. | | 166/263 |
| 5,246,073 A | 9/1993 | Sandiford et al. | | 166/295 |
| 5,259,455 A | 11/1993 | Nimerick et al. | | 166/308.5 |
| 5,330,005 A | 7/1994 | Card et al. | | 166/280.2 |
| 5,342,530 A | 8/1994 | Aften et al. | | 252/8.551 |
| 5,347,004 A | 9/1994 | Rivers et al. | | 544/180 |
| 5,363,919 A | 11/1994 | Jennings, Jr. | | 166/308.1 |
| 5,402,846 A | 4/1995 | Jennings, Jr. et al. | | 166/259 |
| 5,411,091 A | 5/1995 | Jennings, Jr. | | 166/280.1 |
| 5,424,284 A | 6/1995 | Patel et al. | | 507/129 |
| 5,439,055 A | 8/1995 | Card et al. | | 166/280.2 |
| 5,462,721 A | 10/1995 | Pounds et al. | | 423/226 |
| 5,465,792 A | 11/1995 | Dawson et al. | | 166/295 |
| 5,472,049 A | 12/1995 | Chaffee et al. | | 166/250.1 |
| 5,482,116 A | 1/1996 | El-Rabaa et al. | | 166/250.1 |
| 5,488,083 A | 1/1996 | Kinsey, III et al. | | 507/211 |
| 5,497,831 A | 3/1996 | Hainey et al. | | 166/308.1 |
| 5,501,275 A | 3/1996 | Card et al. | | 166/280.2 |
| 5,551,516 A | 9/1996 | Norman et al. | | 166/308.2 |
| 5,624,886 A | 4/1997 | Dawson et al. | | 507/217 |
| 5,635,458 A | 6/1997 | Lee et al. | | 507/240 |
| 5,649,596 A | 7/1997 | Jones et al. | | 166/300 |
| 5,669,447 A | 9/1997 | Walker et al. | | 166/300 |
| 5,674,377 A | 10/1997 | Sullivan, III et al. | | 208/208 R |
| 5,688,478 A | 11/1997 | Pounds et al. | | 423/228 |
| 5,693,837 A | 12/1997 | Smith et al. | | 556/148 |
| 5,711,396 A | 1/1998 | Joerg et al. | | 180/444 |
| 5,722,490 A | 3/1998 | Ebinger | | 166/281 |
| 5,744,024 A | 4/1998 | Sullivan, III et al. | | 208/236 |
| 5,755,286 A | 5/1998 | Ebinger | | 166/281 |
| 5,775,425 A | 7/1998 | Weaver et al. | | 166/276 |
| 5,787,986 A | 8/1998 | Weaver et al. | | 166/280.2 |
| 5,806,597 A | 9/1998 | Tjon-Joe-Pin et al. | | 166/300 |
| 5,807,812 A | 9/1998 | Smith et al. | | 507/238 |
| 5,833,000 A | 11/1998 | Weaver et al. | | 166/276 |
| 5,853,048 A | 12/1998 | Weaver et al. | | 166/279 |
| 5,871,049 A | 2/1999 | Weaver et al. | | 166/276 |
| 5,877,127 A | 3/1999 | Card et al. | | 507/273 |
| 5,908,073 A | 6/1999 | Nguyen et al. | | 166/276 |
| 5,908,814 A | 6/1999 | Patel et al. | | 507/131 |
| 5,964,295 A | 10/1999 | Brown et al. | | 166/308.2 |
| 5,979,557 A | 11/1999 | Card et al. | | 166/300 |
| 5,980,845 A | 11/1999 | Cherry | | 423/229 |
| 6,016,871 A | 1/2000 | Burts, Jr. | | 166/300 |
| 6,035,936 A | 3/2000 | Whalen | | 166/308.5 |
| 6,047,772 A | 4/2000 | Weaver et al. | | 166/276 |
| 6,054,417 A | 4/2000 | Graham et al. | | 507/238 |
| 6,059,034 A | 5/2000 | Rickards et al. | | 166/280.2 |
| 6,060,436 A | 5/2000 | Snyder et al. | | 507/266 |
| 6,069,118 A | 5/2000 | Hinkel et al. | | 507/277 |
| 6,095,244 A * | 8/2000 | Graham et al. | | 166/272.2 |
| 6,123,394 A | 9/2000 | Jeffrey | | 299/16 |
| 6,133,205 A | 10/2000 | Jones | | 507/276 |
| 6,147,034 A | 11/2000 | Jones et al. | | 507/238 |
| 6,162,449 A | 12/2000 | Maier et al. | | 424/401 |
| 6,162,766 A * | 12/2000 | Muir et al. | | 507/267 |
| 6,169,058 B1 | 1/2001 | Le et al. | | 507/222 |
| 6,228,812 B1 | 5/2001 | Dawson et al. | | 507/221 |
| 6,247,543 B1 | 6/2001 | Patel et al. | | 175/64 |
| 6,267,938 B1 | 7/2001 | Warrender et al. | | 423/226 |
| 6,283,212 B1 | 9/2001 | Hinkel et al. | | 166/279 |
| 6,291,405 B1 | 9/2001 | Lee et al. | | 507/136 |
| 6,330,916 B1 | 12/2001 | Rickards et al. | | 166/280.2 |
| 6,725,931 B2 | 4/2004 | Nguyen et al. | | 166/280.2 |
| 6,756,345 B2 | 6/2004 | Pakulski et al. | | 507/246 |
| 6,770,601 B1 * | 8/2004 | Brookey | | 507/102 |
| 6,793,018 B2 | 9/2004 | Dawson et al. | | 166/300 |
| 6,832,650 B2 | 12/2004 | Nguyen et al. | | 166/279 |
| 6,875,728 B2 | 4/2005 | Gupta et al. | | 507/240 |
| 7,140,433 B2 | 11/2006 | Gatlin et al. | | 166/250.01 |
| 7,268,100 B2 | 9/2007 | Kippie et al. | | 507/244 |
| 7,350,579 B2 | 4/2008 | Gatlin et al. | | 166/308.3 |
| 7,654,323 B2 * | 2/2010 | Alary et al. | | 166/280.2 |
| 7,665,522 B2 * | 2/2010 | Sullivan et al. | | 166/300 |
| 7,694,731 B2 * | 4/2010 | Decker | | 166/90.1 |
| 2002/0049256 A1 | 4/2002 | Bergeron, Jr. | | 514/674 |
| 2002/0165308 A1 | 11/2002 | Kinniard et al. | | 524/492 |
| 2003/0220204 A1 | 11/2003 | Baran, Jr. et al. | | 507/200 |
| 2005/0045330 A1 | 3/2005 | Nguyen et al. | | 166/281 |
| 2005/0092489 A1 | 5/2005 | Welton et al. | | 166/280.2 |
| 2005/0137114 A1 | 6/2005 | Gatlin et al. | | 510/424 |
| 2005/0153846 A1 | 7/2005 | Gatlin | | 208/236 |
| 2005/0250666 A1 | 11/2005 | Gatlin et al. | | 510/492 |
| 2006/0194700 A1 | 8/2006 | Gatlin et al. | | 507/203 |
| 2007/0032693 A1 | 2/2007 | Gatlin et al. | | 507/239 |
| 2007/0095528 A1 * | 5/2007 | Ziauddin et al. | | 166/252.3 |
| 2007/0129257 A1 | 6/2007 | Kippie et al. | | 507/102 |
| 2007/0131425 A1 | 6/2007 | Gatlin et al. | | 166/280.2 |
| 2007/0173413 A1 | 7/2007 | Lukocs et al. | | 507/238 |
| 2007/0173414 A1 | 7/2007 | Wilson, Jr. | | 507/131 |
| 2007/0198223 A1 * | 8/2007 | Ella et al. | | 702/188 |
| 2007/0204991 A1 * | 9/2007 | Loree et al. | | 166/280.1 |
| 2008/0039345 A1 | 2/2008 | Kippie et al. | | 507/213 |
| 2009/0050532 A1 * | 2/2009 | Chirico | | 208/177 |
| 2010/0204071 A1 * | 8/2010 | Zhang | | 507/239 |

FOREIGN PATENT DOCUMENTS

| | | | | |
|---|---|---|---|---|
| DE | 4027300 | | 3/1992 | B10D 53/14 |
| EP | 0730018 A1 | | 9/1996 | |
| GB | 775376 | | 5/1957 | |
| GB | 816337 A | | 7/1959 | |
| GB | 1073338 A | | 6/1967 | |

(56) References Cited

FOREIGN PATENT DOCUMENTS

| JP | 08151422 | 6/1996 | |
|----|----------|--------|------------|
| JP | 10001461 | 1/1998 | C07C 211/50 |
| JP | 10110115 A | 4/1998 | |
| JP | 2005194148 A | 7/2005 | |
| WO | WO 98/19774 | 5/1998 | B01D 53/52 |
| WO | WO 98/56497 | 12/1998 | |

OTHER PUBLICATIONS

U.S. Appl. No. 11/554,834, Venditto et al.
U.S. Appl. No. 11/765,306, Kakadjian et al.
U.S. Appl. No. 11/748,248, Thompson et al.
U.S. Appl. No. 11/736,971, Kippie et al.
U.S. Appl. No. 11/767,384, Sweeney et al.
U.S. Appl. No. 11/741,110, Wilson, Jr. et al.
U.S. Appl. No. 11/677,434, Wanner et al.
U.S. Appl. No. 11/736,992, Zamora et al.
U.S. Appl. No. 11/760,581, Schwartz.
U.S. Appl. No. 12/029,335, Kakadjian et al.
Sartori, F. and Savage, D.W., Sterically Hindered Amines for CO2 Removal from Gases, Ind. Eng. Chem. Fundam. 1983, 22, 239-249.
Fushslueger, U., Socher, G., Grether, H-J., Grasserbauer, M., Capillary Supercritical Fluid Chromatography/Mass Spectroscopy of Phenolic Mannich Bases with Dimethyl Ether Modified Ethane as Mobile Phase, Anal. Chem., 1999, 71, 2324-2333.
Kauffman, W.J., Observations on the Synthesis and Characterization of N,N',N"-Tris-(dimethylaminopropyly)hexahydro-s-triazine and isolable intermediates, XP009005168.
Delepine, M., Effect of Hydrogen Sulfide on Trimethyltrimethyl Triamine, Bull. Soc. Chim., 1896, 14, 889-891 (English Translation).
Delepine, M., Effect of Hydrogen Sulfide and Trimethyltrimethyl Triamine, Ann. Chim. Phys., 1896, 4, 114-133 (English Translation).
Paquin, A.M., Reaction of Primary Amines with Aliphatic Aldehydes, Chem. Ber., 1949, 82, 316-326 (English Translation).
Castillo, M., Avila, Y.S., Rodrigues, R.E., Viloria, A., H2S Liquid Scavengers, Their Corrosivity Properites and the Compatibility with Other Down Stream Processes, Corrosion 2000, paper 00491.

\* cited by examiner

METHODS USING LOW CONCENTRATIONS OF GAS BUBBLES TO HINDER PROPPANT SETTLING

BACKGROUND OF THE INVENTION

1. Field of the Invention

The present invention relates to a method for reducing proppant settling rates in fracturing fluids and to compositions and methods for using same.

More particularly, the present invention relates to a method for reducing proppant settling rates in fracturing fluids, where the method involves the step of injecting an amount of a gas below an amount sufficient to form a stable foam into the fracturing fluid, but sufficient to reduce a settling rate of proppants in the fracturing fluid including a proppant. The invention also relates to a composition including a fracturing fluid including proppants and an amount of a gas sufficient to reduce a settling rate of the proppant, yet insufficient to form a stable foam. The invention also relates to a method for fracturing a formation using a composition of this invention.

2. Description of the Related Art

Historically, the oil service industry deals with proppant settling by adjusting the viscosity of the fluid. Another method is to introduce gas or $CO_2$ at high ratios to generate a foam. Foam viscosities are sufficient to suspend the proppant. Other than adjusting the viscosity or inducing a foam, no other methods or system to alter proppant settling rate has been introduced, except for CSI's introduction of proppants made of hollow glass beads.

In early November 2006 CSI Inc. introduced a method that alters the settling rate of proppants in a gelled fluid or frac fluid (fluid used in formation fracturing). The material is introduced to the fracturing fluid to alter the settling rate and is a light weight agglomerated material manufactured by 3M comprised of hollow glass beads, which are commonly used in cementing. These hollow glass beads have a density less than water and are common to cementing for lightening up the cement slurry.

Although several techniques are known for reducing proppant settling rates in fracturing fluids, sometimes referred to herein as frac fluids, there is still a need in the art for a straight forward general technique for reducing proppant settling rates in frac fluids.

SUMMARY OF THE INVENTION

Embodiments of the present invention provide a composition including a fracturing fluid including a proppant and a gas, where the proppant is present in an amount sufficient to prop open fractures introduced into a formation during fracturing and the gas is present in an amount sufficient to reduce a proppant settling rate in the composition. It is thought that the gas forms small bubbles in the fluid, which act to hinder proppant settling or to reduce the density of the proppant or to form micobubble coated particles in the composition, thereby reducing a proppant settling rate.

Embodiments of the present invention also provide a method for reducing proppant settling rate in fracturing fluids (frac fluids), where the method includes the step of injecting a fracturing fluid into a formation at a pressure, at a temperature and for a time sufficient to fracture a formation. If the fracturing fluid includes a proppant, then the method also includes the step of adding a gas to the frac fluid, where the proppant is present in an amount sufficient to prop open fractures introduced into a formation during fracturing and where the gas is introduced in an amount sufficient to reduce a proppant settling rate in the frac fluid, but insufficient to produce a foam. If proppants added to the fracturing fluid after initial fracturing, then the method includes the step of adding a proppant and a gas to the fracturing fluid after initial fracturing, where the proppant is present in an amount sufficient to prop open fractures introduced into a formation during fracturing and where the gas is introduced in an amount sufficient to reduce a proppant settling rate in the frac fluid, but insufficient to produce a foam. The proppant and gas can be added simultaneously at the same location or the gas can be introduced at a different time and at the different location from the proppant. In certain embodiments, the gas and proppant are added at the surface as the fracturing fluid is being pumped down hole. In other embodiments, the proppant is added at the surface as the fracturing fluid is being pumped down hole, while the gas in introduced down hole.

Embodiments of the present invention also provide a method for fracturing a well including the step of providing a frac fluid. Once the frac fluid has been prepared, injecting the fluid into a formation of an oil and/or gas well at a pressure, temperature and flow rate sufficient to cause or produce fractures in the formation, where the proppant is present in an amount sufficient to prop open fractures introduced into the formation during fracturing and where the gas is present in effective amount sufficient to reduce a proppant settling rate in the frac fluid by forming micro bubble coated proppant particles.

Thus, the system of this invention also includes a set of down hole sensors designed to monitor the percent of gas in the fluid at each injection point so that the gas injection rate can be changed to achieve a desired gasification profile across the formation during fracturing.

Embodiments of the methods of this invention can include injecting the gas into the fluid through nozzles designed to produce bubbles in the fluid. In certain embodiments, the nozzles are adapted to produce a large distribution of micro bubbles. In certain embodiments, the microbubbles have an average size between about 10 micron and about 6000 micron (μm or μ). In certain embodiment, a microbubble volume fraction is between about 1 and about 40 percent. In other embodiments, the microbubbles have an average size between about 20 μ and about 5000 μ and a microbubble volume fraction between about 1 and about 20 percent. In other embodiments, the microbubbles have an average size between about 20 μ and about 4000 μ and a microbubble volume fraction between about 1 and about 20 percent. In other embodiments, the microbubbles have an average size between about 20 μ and about 3000 μ and a microbubble volume fraction between about 1 and about 20 percent. In other embodiments, the microbubbles have an average size between about 20 μ and about 2000 μ and a microbubble volume fraction between about 1 and about 20 percent. In other embodiments, the microbubbles have an average size between about 20μ and about 1 000 μ and a microbubble volume fraction between about 1 and about 20 percent.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
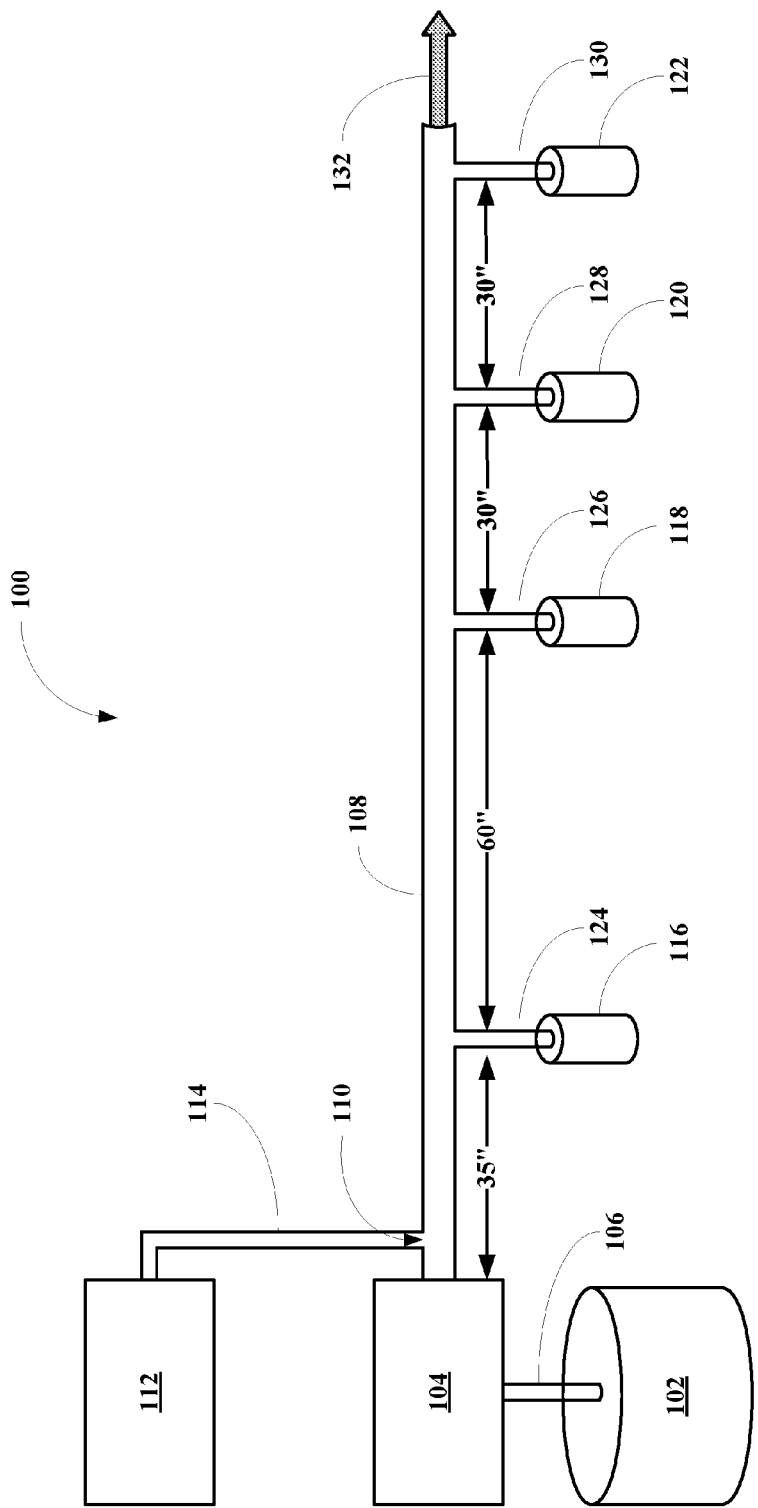
FIG. 1 depicts a suspension test apparatus that is designed to correspond to a fracturing operation where the low concentration of gas is added to the fluid at the surface or at one location down hole.

The inventors have designed a method to hinder or imped the settling of proppant particles in a fracturing fluid, i.e., reduce a proppant settling rate in a frac fluid. The method involves the use of a gas at low concentrations, e.g., gas to fluid ratios less than 1:1, where the gas is a nitrogen containing gas, a carbon dioxide containing gas or any gas other gas having a density less than the density of the frac fluid. The low concentration of gas is commonly referred to as a "quality of gas." The inventors have found that a very low gas quality, far below that required to form a stable foam, provides an effective technique for hindering proppant settling in frac fluids or reducing a proppant settling rate in frac fluids.

While not intending to be bound to any specific theory, the inventors believe that a gas, such as a gas commonly used in the oil industry, used in low concentrations in a frac fluid generates small gas bubbles in fluid that act to hinder proppant settling reducing a proppant settling rate in the frac fluid. The low concentration of gas produces gas bubbles that are dispersed in the frac fluid including an appropriate surfactant for increasing a dispersion of gas bubbles in the frac fluid. It is thought that during a formation fracturing operation, as frac fluid enters formation fractures carrying proppants, that proppant settling is slowed due to gas bubbles moving upwards through the frac fluid and colliding with the proppant particles in the viscosified fracturing fluid, causing the proppant to settle at lower rates compared to a settle rate of the proppants in the absence of the added gas. Further, the inventors suspect that the small bubbles adhere to the proppant particles reducing their density and slowing the proppant settling rate.

While a foam requires a minimum of 53% gas quality in frac fluid and has been used in the industry for years in viscosified frac fluid system, the use of low concentrations of gas as a means to slow proppant settling within that medium is novel. Typically, the amount of gas needed to generate foams, the gas quality, falls between about 53% and about 91%. This range is commonly referred to as the stable foam range. The foam of a viscous medium is known to suspend proppant reducing a proppant settling rate. Gas quality below this range will not yield a stable foam and no foam viscosity is formed. This invention focuses on low gas to liquid ratios, ratios less that 20% gas to fluid. The effects are not to suspend the proppant by generation of a higher viscosity foam, but to slow the settling rate of proppant through collisions of proppants with gas bubbles in the liquid as the particles and bubbles move past each other. This is a novel concept to slow the settling rate of proppant.

Hindered settling of proppant is an age-old criteria in frac fluid design and has historically been addressed with modifications to the viscosity of the system. Another approach involves the use of hollow glass beads having a density less than the fluid. Adding these beads to a frac fluid system has several undesirable downsides: 1) the glass bead size is very large than proppant grain size, 2) the glass bead can be crushed during pumping, and 3) inherent difficulties in adding the glass beads in a uniform manner during the fracturing operation. This invention eliminates the need for adding additional solid material to the frac fluid and provides a logistically easy-to-pump approach utilizing a well-dispersed, low concentration of a gas.

Embodiments of the system and method of this invention involves introducing a low concentration of a gas into a fracturing fluid, where the amount of gas is sufficient to generate small gas bubbles in the fluid to hinder proppant settling, while insufficient to generate a foam. Embodiments of the system and method of this invention uses conventional methods of introducing gas into the frac fluid. The low concentration of gas bubbles are dispersed in the frac fluid. During formation fracturing, as fluid is introduced into the fracture carrying proppant particles, the particles begin to settle or fall down through the fluid, while simultaneously, gas bubbles are rising or moving up through the fluid. When gas bubbles collide with proppant particles, the proppant particles settle at a lower rate as compared to their settling rate in the absence of the added the gas bubbles. Again, the gas is added at an amount below the amount needed to form a foam. In certain embodiments, the gas concentration is less than half of the lower limit of the quality gas range of 53% to 91%. In certain embodiments, the gas is present in a ratio of less that 30% gas to fluid. In other embodiments, the gas is present in a ratio of less that 25% gas to fluid. In other embodiments, the gas is present in a ratio of less that 20% gas to fluid. In other embodiments, the gas is present in a ratio of less that 15% gas to fluid.

Suitable Reagents and Devices

Suitable gases for use in this invention include, without limitation, nitrogen, membrane nitrogen, $CO_2$, compressed air, an exhaust air, a flue gas, or mixtures or combinations thereof.

Suitable nozzles for use in this invention include, without limitation, any nozzle designed to reduce the particle size of a gas being injected into a fluid. In certain embodiments, the gas in co-injected with a portion of a fluid compatible with the fracturing fluid so that the gas enters the bulk fluid as micro bubbles. Exemplary examples of nozzles include nebulizers, atomizers or other types of devices that reduce gas bubble size when a gas is injected into a liquid.

Suitable proppants for use in the invention include, without limitation, all traditional proppants. In certain embodiments, the proppants include recesses in which or surfaces on which microbubbles can accumulate to increase proppant buoyancy.

Fracturing Fluids

Generally, a hydraulic fracturing treatment involves pumping a proppant-free viscous fluid, or pad, usually water with some fluid additives to generate high viscosity, into a well faster than the fluid can escape into the formation so that the pressure rises and the rock breaks, creating artificial fracture and/or enlarging existing fracture. After fracturing the formation, a propping agent, generally a solid material such as sand is added to the fluid to form a slurry that is pumped into the newly formed fractures in the formation to prevent them from closing when the pumping pressure is released. The proppant transport ability of a base fluid depends on the type of viscosifying additives added to the water base.

Water-base fracturing fluids with water-soluble polymers added to make a viscosified solution are widely used in the art of fracturing. Since the late 1950s, more than half of the fracturing treatments are conducted with fluids comprising guar gums, high-molecular weight polysaccharides composed of mannose and galactose sugars, or guar derivatives such as hydropropyl guar (HPG), carboxymethyl guar (CMG). carboxymethylhydropropyl guar (CMHPG). Crosslinking agents based on boron, titanium, zirconium or aluminum complexes are typically used to increase the effective molecular weight of the polymer and make them better suited for use in high-temperature wells.

To a lesser extent, cellulose derivatives such as hydroxyethylcellulose (HEC) or hydroxypropylcellulose (HPC) and carboxymethylhydroxyethylcellulose (CMHEC) are also used, with or without crosslinkers. Xanthan and scleroglucan, two biopolymers, have been shown to have excellent proppant-suspension ability even though they are more expensive than guar derivatives and therefore used less frequently. Polyacrylamide and polyacrylate polymers and copolymers are used typically for high-temperature applications or friction reducers at low concentrations for all temperatures ranges.

Polymer-free, water-base fracturing fluids can be obtained using viscoelastic surfactants. These fluids are normally prepared by mixing in appropriate amounts of suitable surfactants such as anionic, cationic, nonionic and zwitterionic surfactants. The viscosity of viscoelastic surfactant fluids is attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

The proppant type can be sand, intermediate strength ceramic proppants (available from Carbo Ceramics, Norton Proppants, etc.), sintered bauxites and other materials known to the industry. Any of these base propping agents can further be coated with a resin (available from Santrol, a Division of Fairmount Industries, Borden Chemical, etc.) to potentially improve the clustering ability of the proppant. In addition, the proppant can be coated with resin or a proppant flowback control agent such as fibers for instance can be simultaneously pumped. By selecting proppants having a contrast in one of such properties such as density, size and concentrations, different settling rates will be achieved.

"Waterfrac treatments employ the use of low cost, low viscosity fluids in order to stimulate very low permeability reservoirs. The results have been reported to be successful (measured productivity and economics) and rely on the mechanisms of asperity creation (rock spalling), shear displacement of rock and localized high concentration of proppant to create adequate conductivity. It is the last of the three mechanisms that is mostly responsible for the conductivity obtained in "waterfrac" treatments. The mechanism can be described as analogous to a wedge splitting wood.

An aqueous fracturing fluid may be prepared by blending a hydratable polymer with an aqueous base fluid. The base aqueous fluid can be, for example, water or brine. Any suitable mixing apparatus may be used for this procedure. In the case of batch mixing, the hydratable polymer and aqueous fluid are blended for a period of time which is sufficient to form a hydrated sol.

Hydraulic fracturing techniques are widely employed to enhance oil and gas production from subterranean formations. During hydraulic fracturing, fluid is injected into a well bore under high pressure. Once the natural reservoir pressures are exceeded, the fracturing fluid initiates a fracture in the formation which generally continues to grow during pumping. As the fracture widens to a suitable width during the course of the treatment, a propping agent is then also added to the fluid. The treatment design generally requires the fluid to reach a maximum viscosity as it enters the fracture which affects the fracture length and width. The viscosity of most fracturing fluids is generated from water-soluble polysaccharides, such as galactomannans or cellulose derivatives.

Employing crosslinking agents, such as borate, titanate, or zirconium ions, can further increase the viscosity. The gelled fluid may be accompanied by a propping agent (i.e., proppant) which results in placement of the proppant within the fracture thus produced. The proppant remains in the produced fracture to prevent the complete closure of the fracture and to form a conductive channel extending from the well bore into the formation being treated once the fracturing fluid is recovered.

In order for the treatment to be successful, it is preferred that the fluid viscosity eventually diminish to levels approaching that of water after the proppant is placed. This allows a portion of the treating fluid to be recovered without producing excessive amounts of proppant after the well is opened and returned to production. The recovery of the fracturing fluid is accomplished by reducing the viscosity of the fluid to a lower value such that it flows naturally from the formation under the influence of formation fluids. This viscosity reduction or conversion is referred to as "breaking" and can be accomplished by incorporating chemical agents, referred to as "breakers," into the initial gel.

Certain gels of fracturing fluids, such as those based upon guar polymers, undergo a natural break without the intervention of a breaking agent. However, the breaking time for such gelled fluids generally is excessive and impractical, being somewhere in the range from greater than 24 hours to in excess of weeks, months, or years depending on reservoir conditions. Accordingly, to decrease the break time of gels used in fracturing, chemical agents are usually incorporated into the gel and become a part of the gel itself. Typically, these agents are either oxidants or enzymes which operate to degrade the polymeric gel structure. Most degradation or "breaking" is caused by oxidizing agents, such as persulfate salts (used either as is or encapsulated), chromous salts, organic peroxides or alkaline earth or zinc peroxide salts, or by enzymes.

In addition to the importance of providing a breaking mechanism for the gelled fluid to facilitate recovery of the fluid and to resume production, the timing of the break is also of great importance. Gels which break prematurely can cause suspended proppant material to settle out of the gel before being introduced a sufficient distance into the produced fracture. Premature breaking can also lead to a premature reduction in the fluid viscosity, resulting in a less than desirable fracture width in the formation causing excessive injection pressures and premature termination of the treatment.

On the other hand, gelled fluids which break too slowly can cause slow recovery of the fracturing fluid from the produced fracture with attendant delay in resuming the production of formation fluids and severely impair anticipated hydrocarbon production. Additional problems may occur, such as the tendency of proppant to become dislodged from the fracture, resulting in at least partial closing and decreased efficiency of the fracturing operation. Preferably, the fracturing gel should begin to break when the pumping operations are concluded. For practical purposes, the gel preferably should be completely broken within about 24 hours after completion of the fracturing treatment. Gels useful in this regard include those disclosed in U.S. Pat. Nos. 3,960,736; 5,224,546; 6,756,345; and 6,793,018, incorporated herein by reference.

Suitable solvents fore use in this invention include, without limitation, water. The solvent may be an aqueous potassium chloride solution.

Suitable inorganic breaking agent include, without limitation, a metal-based oxidizing agent, such as an alkaline earth metal or a transition metal; magnesium peroxide, calcium peroxide, or zinc peroxide.

Suitable ester compound include, without limitation, an ester of a polycarboxylic acid, e.g., an ester of oxalate, citrate, or ethylene diamine tetraacetate. Ester compound having hydroxyl groups can also be acetylated, e.g., acetylated citric acid to form acetyl triethyl citrate.

Suitable hydratable polymers that may be used in embodiments of the invention include any of the hydratable polysaccharides which are capable of forming a gel in the presence of a crosslinking agent. For instance, suitable hydratable polysaccharides include, but are not limited to, galactomannan gums, glucomannan gums, guars, derived guars, and cellulose derivatives. Specific examples are guar gum, guar gum derivatives, locust bean gum, Karaya gum, carboxymethyl cellulose, carboxymethyl hydroxyethyl cellulose, and hydroxyethyl cellulose. Presently preferred gelling agents include, but are not limited to, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. Other suitable polymers are known to those skilled in the art.

The hydratable polymer may be present in the fluid in concentrations ranging from about 0.10% to about 5.0% by weight of the aqueous fluid. In certain embodiment, a range for the hydratable polymer is about 0.20% to about 0.80% by weight.

A suitable crosslinking agent can be any compound that increases the viscosity of the fluid by chemical crosslinking, physical crosslinking, or any other mechanisms. For example, the gellation of a hydratable polymer can be achieved by crosslinking the polymer with metal ions including boron, zirconium, and titanium containing compounds, or mixtures thereof. One class of suitable crosslinking agents is organotitanates. Another class of suitable crosslinking agents is borates as described, for example, in U.S. Pat. No. 4,514,309. The selection of an appropriate crosslinking agent depends upon the type of treatment to be performed and the hydratable polymer to be used. The amount of the crosslinking agent used also depends upon the well conditions and the type of treatment to be effected, but is generally in the range of from about 10 ppm to about 1000 ppm of metal ion of the crosslinking agent in the hydratable polymer fluid. In some applications, the aqueous polymer solution is crosslinked immediately upon addition of the crosslinking agent to form a highly viscous gel. In other applications, the reaction of the crosslinking agent can be retarded so that viscous gel formation does not occur until the desired time.

The organotitanate constituent can be TYZOR.RTM. titanium chelate esters from E.I du Pont de Nemours & Company. The organotitanate constituent can be a mixture of a first organotitanate compound having a lactate base and a second organotitanate compound having triethanolamine base.

The boron constituent can be selected from the group consisting of boric acid, sodium tetraborate, and mixtures thereof. These are described in U.S. Pat. No. 4,514,309.), borate based ores such as ulexite and colemanite, Ti(IV) acetylacetonate, Ti(IV) triethanolamine, Zr lactate, Zr triethanolamine, Zr lactate-triethanolamine, or Zr lactate-triethanolamine-triisopropanolamine. In some embodiments, the well treatment fluid composition may further comprise a proppant.

"Premature breaking" as used herein refers to a phenomenon in which a gel viscosity becomes diminished to an undesirable extent before all of the fluid is introduced into the formation to be fractured. Thus, to be satisfactory, the gel viscosity should preferably remain in the range from about 50% to about 75% of the initial viscosity of the gel for at least two hours of exposure to the expected operating temperature. Preferably the fluid should have a viscosity in excess of 100 centipoise (cP) at 100 sec$^{-1}$ while injection into the reservoir as measured on a Fann 50 C viscometer in the laboratory.

"Complete breaking" as used herein refers to a phenomenon in which the viscosity of a gel is reduced to such a level that the gel can be flushed from the formation by the flowing formation fluids or that it can be recovered by a swabbing operation. In laboratory settings, a completely broken, non-crosslinked gel is one whose viscosity is about 10 cP or less as measured on a Model 35 Fann viscometer having a R1B1 rotor and bob assembly rotating at 300 rpm.

The pH of an aqueous fluid which contains a hydratable polymer can be adjusted if necessary to render the fluid compatible with a crosslinking agent. Preferably, a pH adjusting material is added to the aqueous fluid after the addition of the polymer to the aqueous fluid. Typical materials for adjusting the pH are commonly used acids, acid buffers, and mixtures of acids and bases. For example, sodium bicarbonate, potassium carbonate, sodium hydroxide, potassium hydroxide, and sodium carbonate are typical pH adjusting agents. Acceptable pH values for the fluid may range from neutral to basic, i.e., from about 5 to about 14. Preferably, the pH is kept neutral or basic, i.e., from about 7 to about 14, more preferably between about 8 to about 12.

The term "breaking agent" or "breaker" refers to any chemical that is capable of reducing the viscosity of a gelled fluid. As described above, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow into the well bore. This reduction in viscosity of the treating fluid is commonly referred to as "breaking". Consequently, the chemicals used to break the viscosity of the fluid is referred to as a breaking agent or a breaker.

There are various methods available for breaking a fracturing fluid or a treating fluid. Typically, fluids break after the passage of time and/or prolonged exposure to high temperatures. However, it is desirable to be able to predict and control the breaking within relatively narrow limits. Mild oxidizing agents are useful as breakers when a fluid is used in a relatively high temperature formation, although formation temperatures of 300° F. (149° C.) or higher will generally break the fluid relatively quickly without the aid of an oxidizing agent.

Examples of inorganic breaking agents for use in this invention include, but are not limited to, persulfates, percarbonates, perborates, peroxides, perphosphates, permanganates, etc. Specific examples of inorganic breaking agents include, but are not limited to, alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate, and so on. Additional suitable breaking agents are disclosed in U.S. Pat. Nos. 5,877,127; 5,649,596; 5,669,447; 5,624,886; 5,106,518; 6,162,766; and 5,807,812. In some embodiments, an inorganic breaking agent is selected from alkaline earth metal or transition metal-based oxidizing agents, such as magnesium peroxides, zinc peroxides, and calcium peroxides.

In addition, enzymatic breakers may also be used in place of or in addition to a non-enzymatic breaker. Examples of suitable enzymatic breakers such as guar specific enzymes, alpha and beta amylases, amyloglucosidase, aligoglucosidase, invertase, maltase, cellulase, and hemi-cellulase are disclosed in U.S. Pat. Nos. 5,806,597 and 5,067,566.

A breaking agent or breaker maybe used "as is" or be encapsulated and activated by a variety of mechanisms including crushing by formation closure or dissolution by formation fluids. Such techniques are disclosed, for example, in U.S. Pat. Nos. 4,506,734; 4,741,401; 5,110,486; and 3,163,219.

Generally, the temperature and the pH of a fracturing fluid affects the rate of hydrolysis of an ester. For downhole operations, the bottom hole static temperature ("BHST") cannot be easily controlled or changed. The pH of a fracturing fluid usually is adjusted to a level to assure proper fluid performance during the fracturing treatment. Therefore, the rate of hydrolysis of an ester could not be easily changed by altering BHST or the pH of a fracturing fluid. However, the rate of hydrolysis may be controlled by the amount of an ester used in a fracturing fluid. For higher temperature applications, the hydrolysis of an ester may be retarded or delayed by dissolving the ester in a hydrocarbon solvent. Moreover, the delay time may be adjusted by selecting esters that provide more or less water solubility. For example, for low temperature applications, polycarboxylic esters made from low molecular weight alcohols, such as methanol or ethanol, are recommended. The application temperature range for these esters could range from about 120° F. to about 250° F. (about 49° C. to about 121° C.). On the other hand, for higher temperature applications or longer injection times, esters made from higher molecular weight alcohols should preferably be used. The higher molecular weight alcohols include, but are not limited to, $C_3$ -$C_6$ alcohols, e.g., n-propanol, hexanol, and cyclohexanol.

Propping agents or proppants are typically added to the fracturing fluid prior to the addition of a crosslinking agent. However, proppants may be introduced in any manner which achieves the desired result. Any proppant may be used in embodiments of the invention. Examples of suitable proppants include, but are not limited to, quartz sand grains, glass and ceramic beads, walnut shell fragments, aluminum pellets, nylon pellets, and the like. Proppants are typically used in concentrations between about 1 to 8 lbs. per gallon of a fracturing fluid, although higher or lower concentrations may also be used as desired. The fracturing fluid may also contain other additives, such as surfactants, corrosion inhibitors, mutual solvents, stabilizers, paraffin inhibitors, tracers to monitor fluid flow back, and so on.

The well treatment fluid composition in accordance with embodiments of the invention has many useful applications. For example, it may be used in hydraulic fracturing, gravel packing operations, water blocking, temporary plugs for purposes of wellbore isolation and/or fluid loss control, and other well completion operations. One application of the fluid composition is to use it as a fracturing fluid. Accordingly, embodiments of the invention also provide a method of treating a subterranean formation. The method includes formulating a fracturing fluid comprising an aqueous fluid, a hydratable polymer, a crosslinking agent, an inorganic breaking agent, and an ester compound; and injecting the fracturing fluid into a bore hole to contact at least a part of the formation by the fracturing fluid under a sufficient pressure to fracture the formation. Initially, the viscosity of the fracturing fluid should be maintained above at least 200 cP at 40 sec$^{-1}$ during injection and, afterwards, should be reduced to less than 200 cP at 40 sec$^{-1}$. After the viscosity of the fracturing fluid is lowered to an acceptable level, at least a portion of the fracturing fluid is removed from the formation. During the fracturing process, a proppant can be injected into the formation simultaneously with the fracturing fluid. Preferably, the fracturing fluid has a pH around or above about 7, more preferably in the range of about 8 to about 12.

It should be understood that the above-described method is only one way to carry out embodiments of the invention. The following U.S. patents disclose various techniques for conducting hydraulic fracturing which may be employed in embodiments of the invention with or without modifications: U.S. Pat. Nos. 6,169,058; 6,135,205; 6,123,394; 6,016,871; 5,755,286; 5,722,490; 5,711,396; 5,551,516; 5,497,831; 5,488,083; 5,482,116; 5,472,049; 5,411,091; 5,402,846; 5,392,195; 5,363,919; 5,228,510; 5,074,359; 5,024,276; 5,005,645; 4,938,286; 4,926,940; 4,892,147; 4,869,322; 4,852,650; 4,848,468; 4,846,277; 4,830,106; 4,817,717; 4,779,680; 4,479,041; 4,739,834; 4,724,905; 4,718,490; 4,714,115; 4,705,113; 4,660,643; 4,657,081; 4,623,021; 4,549,608; 4,541,935; 4,378,845; 4,067,389; 4,007,792; 3,965,982; and 3,933,205.

The liquid carrier can generally be any liquid carrier suitable for use in oil and gas producing wells. A presently preferred liquid carrier is water. The liquid carrier can comprise water, can consist essentially of water, or can consist of water. Water will typically be a major component by weight of the fluid. The water can be potable or non-potable water. The water can be brackish or contain other materials typical of sources of water found in or near oil fields. For example, it is possible to use fresh water, brine, or even water to which any salt, such as an alkali metal or alkali earth metal salt (NaCO.sub.3, NaCl, KCl, etc.) has been added. The liquid carrier is preferably present in an amount of at least about 80% by weight. Specific examples of the amount of liquid carrier include 80%, 85%, 90%, and 95% by weight.

All the fracturing fluids described above are described herein in relationship to the sole use or combined use of a microbial based viscosity breaking composition, apparatus or method of this invention. Of course, the microbial based viscosity breaking composition, apparatus or method of this invention can be used in conjunction or combinations of other gelling and breaking compositions to achieve a desired fracturing and breaking profile (viscosity versus time profile).

DETAILED DESCRIPTION OF THE DRAWINGS

Referring now to FIG. 1, a first suspension test apparatus of this invention, generally 100, is shown. The test apparatus is designed to test proppant settling rates along a length of tubing with settling stations distributed along the length of the tubing to test settling rates at that location along the length of the tubing. This apparatus is designed to mimic fracturing of a formation using a single injection format of a gas in an amount below the fluid foam point amount for the fluid, where the injection can occur at the surface or at a single location down hole and the settling stations correspond to sites along the fractured formation.

The apparatus 100 includes a frac fluid supply tank 102 connected to a pump 104 via a supply line 106. The pump 104 is designed to pump the frac fluid into a pipe 108. At a location 110 downstream from the pump 104, a low concentration of a gas from a gas supply unit 112 is injected into the fluid in the pipe 108 via gas injection line 114, where the gas is adapted to reduced proppant settling rates. Approximately 35 inches downstream from the pump 104 is a first settling station 116, where a settling rate of proppant at this locations is measured. Approximately, 60 inches downstream of the first settling station 116 is a second settling station 118, where the settling rate of proppant at this location is measured. Approximately, 30 inches downstream of the second settling station 118 is a third settling station 120, where the settling rate of proppant at this location is measured. Approximately, 30 inches downstream of the third settling station 120 is a fourth settling station 122, where the settling rate of proppant at this location is measured. The settling stations 116, 118, 122, and 122 are connected to the pipe 108 via transfer lines 124, 126, 128, and 130, respectively. In a fracturing operation, the transfer lines 124, 126, 128 and 130 would represent sites along the formation. The test fluid exits the pipe 108 through free discharge end 132. In a fracturing operation, the free discharge would be at the surface.

Figure 2:
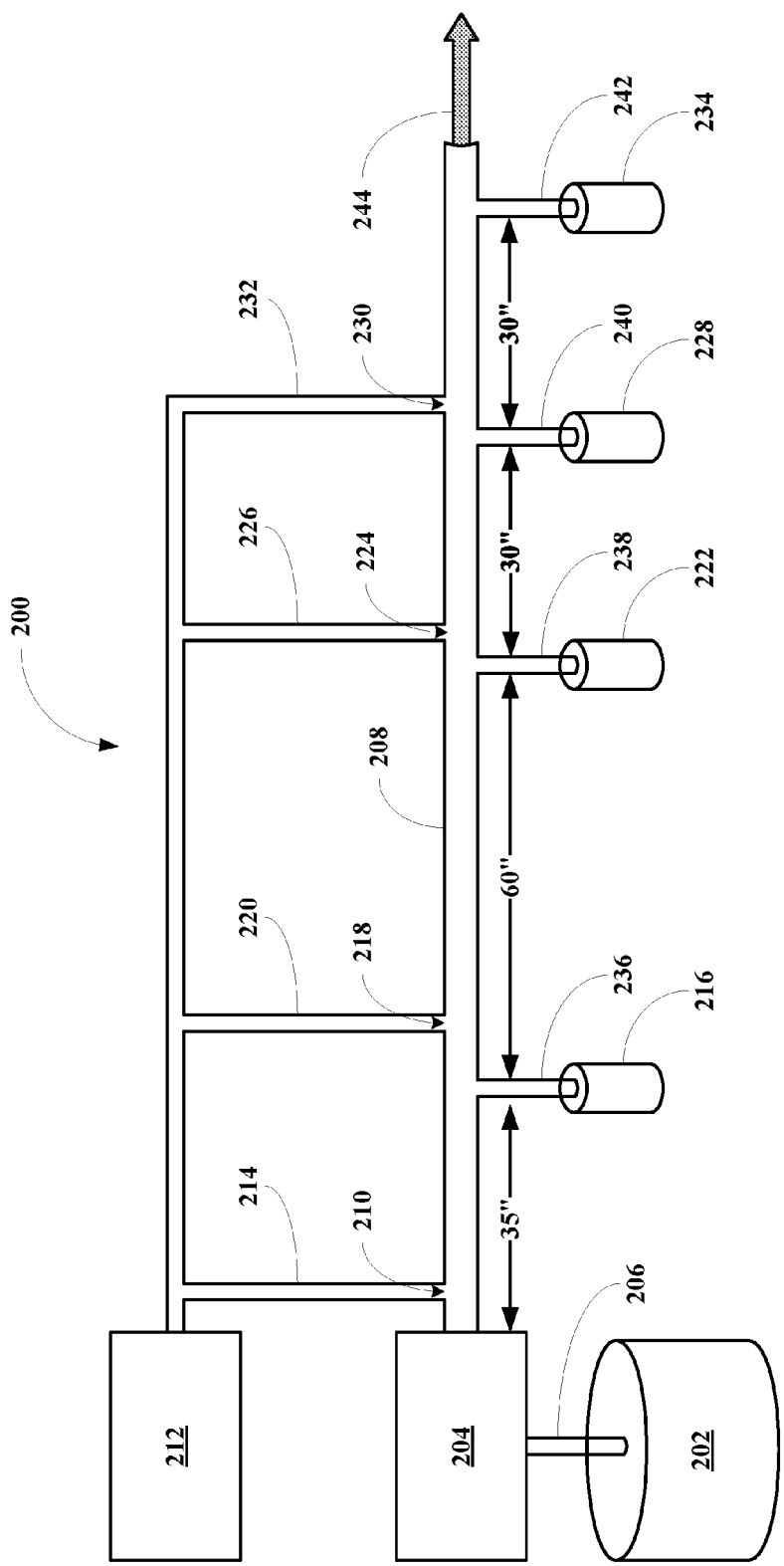
FIG. 2 depicts a suspension test apparatus that is designed to correspond to a fracturing operation where the low concentration of gas is added to the fluid at the surface and at multiple located down hole or at multiple locations down hole.

Referring now to FIG. 2, a second suspension test apparatus of this invention, generally 200, is shown. The test apparatus is designed to test proppant settling rates along a length of tubing with settling stations distributed along the length of the tubing to test settling rates at that location along the length of the tubing. This apparatus is designed to mimic fracturing of a formation using a multiple point of injection format of a gas in an amount below the fluid foam point amount fro the fluid, where the injections can occur at the surface and at multiple locations down hole or at multiple locations down hole and the settling stations correspond to sites along the fractured formation. The down hole locations can include a location before the formation and locations within the formation being fractured.

The apparatus 200 includes a frac fluid supply tank 202 connected to a pump 204 via a supply line 206. The pump 204 is designed to pump the frac fluid into a pipe 208. At a location 210 downstream from the pump 204, a first amount of a gas from a gas supply unit 212 is injected into the fluid in the pipe 208 via gas injection line 214, where the gas is adapted to reduced proppant settling rates. Approximately 35 inches downstream from the pump 204 is a first settling station 216, where a settling rate of proppant at this locations is measured. At a location 218 downstream from the first settling station 216, a second amount of a gas is injected into the fluid in the pipe 208 via gas injection line 220, where the gas is adapted to reduced proppant settling rates. Approximately, 60 inches downstream of the first settling station 216 is a second settling station 222, where the settling rate of proppant at this location is measured. At a location 224 downstream from the second settling station 222, a third amount of a gas is injected into the fluid in the pipe 208 via gas injection line 226, where the gas is adapted to reduced proppant settling rates. Approximately, 30 inches downstream of the second settling station 222 is a third settling station 228, where the settling rate of proppant at this location is measured. At a location 230 downstream from the third settling station 228, a fourth amount of a gas is injected into the fluid in the pipe 208 via gas injection line 232, where the gas is adapted to reduced proppant settling rates. Approximately, 30 inches downstream of the third settling station 228 is a fourth settling station 234, where the settling rate of proppant at this location is measured. The settling stations 216, 222, 228, and 234 are connected to the pipe 208 via transfer lines 236, 238, 240, and 242, respectively. In a fracturing operation, the transfer lines 236, 238, 240 and 242 would represent sites along the formation. The test fluid exits the pipe 208 through free discharge end 244. In a fracturing operation, the free discharge would be at the surface.

EXPERIMENTS OF THE INVENTION

EXAMPLE 1

In this example, proppant settling rates were measured using a slick water fracturing fluid, where the fluid includes a proppant in the apparatus of FIG. 1. The proppant used was 20/40 sand in an amount of 0.5 lb/gal of the slick water fracturing fluid.

The slick water fracturing fluid including the sand was pumped by the pump 104 from its slurry tank 102 into the flow line 108 at flow rates between 1.42 gal/min and 1.31 gal/min. Air was used as the gas in this example and was supplied from a cylinder or unit 112 into the line 108 via the line 114 at flow rates between 0 gal/min and 0.120 gal/min, corresponding to a gas phase percentage between 0% and 9.16% gas. The settling rate at the four stations 116, 118, 120 and 122 were measured and are tabulated in Table 1.

TABLE 1

| | Slick Water Fracturing Fluid Proppant Suspension Test | | | | | | |
|---|---|---|---|---|---|---|---|
| Test # | Flow Rate Air (gal/min) | Flow Rate Slick Water Frac Fluid (gal/min) | % Gas Phase | Time to Fill Station 1 (sec) | Time to Fill Station 2 (sec) | Time to Fill Station 3 (sec) | Time to Fill Station 4 (sec) |
| 1 | 0.000 | 1.42 | 0.00 | 11 | 14 | 19 | 21 |
| 2 | 0.098 | 1.38 | 7.10 | 34 | 29 | 25 | 23 |
| 3 | 0.120 | 1.31 | 9.16 | 41 | 31 | 26 | 25 |

Maximum Weight of Sand fill one column 107 gr
Sand Slurry 0.5 lb/gal 20/40 sand in Slick water
Column inner diameter 15 mm From the data, it is clear that the addition of a low concentration of gas into the slurry results in significant reductions in proppant settling rates. If we define the rate as the reciprocal of the time to fill a column with proppant, then we can get an estimate of the decrease in settling rate evidenced by the data.

The settling rate at the first station for no added gas is 1/11 $s^{-1}$. When 7.10% of gas was added, the settling rate decreased to 1/34 $s^{-1}$. When 9.16% of gas was added, the settling rate decreased to 1/41 $s^{-1}$.

The settling rate at the second station for no added gas is 1/14 $s^{-1}$. When 7.10% of gas was added, the settling rate decreased to 1/29 $s^{-1}$. When 9.16% of gas was added, the settling rate decreased to 1/31 $s^{-1}$.

The settling rate at the third station for no added gas is 1/19 $s^{-1}$. When 7.10% of gas was added, the settling rate decreased to 1/25 $s^{-1}$. When 9.16% of gas was added, the settling rate decreased to 1/26 $s^{-1}$.

The settling rate at the third station for no added gas is 1/21 $s^{-1}$. When 7.10% of gas was added, the settling rate decreased to 1/23 $s^{-1}$. When 9.16% of gas was added, the settling rate decreased to 1/25 $s^{-1}$.

It is also clear that the further away from the gas injection site, the smaller the effect.

EXAMPLE 2

In this example, proppant settling rates were measured using a guar gum fracturing fluid, where the fluid includes a proppant in the apparatus of FIG. 1. The proppant used was 20/40 sand in an amount of 0.5 lb/gal of the guar gum fracturing fluid.

The guar gum fracturing fluid including the sand was pumped by the pump 104 from its slurry tank 102 into the flow line 108 at flow rates between 1.32 gal/min and 1.21 gal/min. Air was used as the gas in this example and was supplied from a cylinder or unit 112 into the line 108 via the line 114 at flow rates between 0 gal/min and 0.123 gal/min, corresponding to a gas phase percentage between 0% and 10.17% gas. The settling rate at the four stations 116, 118, 120 and 122 were measured and are tabulated in Table 2.

TABLE 2

Guar Gum Fracturing Fluid Proppant Suspension Test

| Test # | Flow Rate Air (gal/min) | Flow Rate Guar Gum Frac Fluid (gal/min) | % Gas Phase | Time to Fill Station 1 (sec) | Time to Fill Station 2 (sec) | Time to Fill Station 3 (sec) | Time to Fill Station 4 (sec) |
|---|---|---|---|---|---|---|---|
| 1 | 0.000 | 1.32 | 0.00 | 22 | 34 | 29 | 31 |
| 2 | 0.090 | 1.27 | 7.09 | 54 | 49 | 42 | 35 |
| 3 | 0.123 | 1.21 | 10.17 | 62 | 51 | 44 | 36 |

Maximum Weight of Sand fill one column 107 gr

Sand Slurry 0.5 lb/gal 20/40 in 10 lb/1000 gal guar gum solution

Column inner diameter 15 mm

From the data, it is clear that the addition of a low concentration of gas into the slurry results in significant reductions in proppant settling rates. If we define the rate as the reciprocal of the time to fill a column with proppant, then we can get an estimate of the decrease in settling rate evidenced by the data.

The settling rate at the first station for no added gas is 1/22 $s^{-1}$. When 7.09% of gas was added, the settling rate decreased to 1/54 $s^{-1}$. When 10.17% of gas was added, the settling rate decreased to 1/62 $s^{-1}$.

The settling rate at the second station for no added gas is 1/34 $s^{-1}$. When 7.09% of gas was added, the settling rate decreased to 1/49 $s^{-1}$. When 10.17% of gas was added, the settling rate decreased to 1/51 $s^{-1}$.

The settling rate at the third station for no added gas is 1/31 $s^{-1}$. When 7.09% of gas was added, the settling rate decreased to 1/35 $s^{-1}$. When 10.17% of gas was added, the settling rate decreased to 1/44 $s^{-1}$.

The settling rate at the third station for no added gas is 1/21 $s^{-1}$. When 7.09% of gas was added, the settling rate decreased to 1/23 $s^{-1}$. When 10.17% of gas was added, the settling rate decreased to 1/36 $s^{-1}$.

It is also clear that the further away from the gas injection site, the smaller the effect.

EXAMPLE 3

In this is a prophetic example, proppant settling rates are measured using a slick water fracturing fluid, where the fluid includes a proppant in the apparatus of FIG. 2. The proppant use is 20/40 sand in an amount of 0.5 lb/gal of the slick water fracturing fluid.

The slick water fracturing fluid including the sand is pumped by the pump 104 from its slurry tank 202 into the flow line 208 at flow rates between 1.42 gal/min and 1.31 gal/min. Air is used as the gas in this example and is supplied from a cylinder or unit 212 into the line 208 via the lines 214, 220, 226, and 232 at flow rates between 0 gal/min and 0.120 gal/min, corresponding to a gas phase percentage between 0% and 9.16% gas. The settling rate at the four stations 216, 222, 228 and 234 are measured and tabulated in Table 3.

TABLE 3

Slick Water Fracturing Fluid Proppant Suspension Test

| Test # | Flow Rate Air (gal/min) | Flow Rate Slick Water Frac Fluid (gal/min) | % Gas Phase | Time to Fill Station 1 (sec) | Time to Fill Station 2 (sec) | Time to Fill Station 3 (sec) | Time to Fill Station 4 (sec) |
|---|---|---|---|---|---|---|---|
| 1 | 0.000 | 1.42 | 0.00 | 11 | 14 | 19 | 21 |
| 2 | 0.098 | 1.38 | 7.10 | 34 | 34 | 34 | 34 |
| 3 | 0.120 | 1.31 | 9.16 | 41 | 41 | 41 | 41 |

Maximum Weight of Sand fill one column 107 gr

Sand Slurry 0.5 lb/gal 20/40 sand in Slick water

Column inner diameter 15 mm

The first, second, third and fourth gas amounts introduced into the line 208 at the four injection points 210, 218, 224, and 230 are adjusted so that the times to fill the station measuring columns are substantially similar.

EXAMPLE 4

In this example, proppant settling rates were measured using a guar gum fracturing fluid, where the fluid includes a proppant in the apparatus of FIG. 2. The proppant used is 20/40 sand in an amount of 0.5 lb/gal of the guar gum fracturing fluid.

The slick water fracturing fluid including the sand is pumped by the pump 104 from its slurry tank 202 into the flow line 208 at flow rates between 1.32 gal/min and 1.21 gal/min. Air is used as the gas in this example and is supplied from a cylinder or unit 212 into the line 208 via the lines 214, 220, 226, and 232 at flow rates between 0 gal/min and 0.123 gal/min, corresponding to a gas phase percentage between 0% and 10.17% gas. The settling rate at the four stations 216, 222, 228 and 234 are measured and tabulated in Table 4.

TABLE 4

Guar Gum Fracturing Fluid Proppant Suspension Test

| Test # | Flow Rate Air (gal/min) | Flow Rate Guar Gum Frac Fluid (gal/min) | % Gas Phase | Time to Fill Station 1 (sec) | Time to Fill Station 2 (sec) | Time to Fill Station 3 (sec) | Time to Fill Station 4 (sec) |
|---|---|---|---|---|---|---|---|
| 1 | 0.000 | 1.32 | 0.00 | 22 | 34 | 29 | 31 |
| 2 | 0.090 | 1.27 | 7.09 | 54 | 54 | 54 | 54 |
| 3 | 0.123 | 1.21 | 10.17 | 62 | 62 | 62 | 62 |

Maximum Weight of Sand fill one column 107 gr
Sand Slurry 0.5 lb/gal 20/40 in 10 lb/1000 gal guar gum solution
Column inner diameter 15 mm The first, second, third and fourth gas amounts introduced into the line 208 at the four injection points 210, 218, 224, and 230 are adjusted so that the times to fill the station measuring columns are substantially similar.

In prophetic Example 3 and Example 4, the settling rates at each location can be adjusted to a desired value by changing the amount of gas being introduced at each site. It should also be recognized that the amount of gas introduced at each location will change because of each upstream gas injection. Thus, the system of this invention also includes a set of down hole sensors designed to monitor the percent of gas in the fluid at each injection point so that the gas injection rate can be changed to achieve a desired gasification profile across the formation during fracturing.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for fracturing a formation comprising:
   pumping a liquid fracturing fluid into a formation to be fractured at a liquid pressure sufficient to fracture the formation, where the fluid includes a proppant,
   during pumping, injecting a gas into the liquid fracturing fluid at a single downhole location and at a gas injection rate below an amount that would convert the fluid into a stable foam, and
   changing the gas injection rate to produce a desired gasification profile in the fracturing fluid across the formation to be fractured during fracturing,
   where the injecting produces gas microbubbles having an average size between about 10 and about 6000 micron (μm or μ) in the fracturing fluid, where the gasification profile is characterized by having a gas to fluid ratio of less than 20% and a microbubble volume fraction in the fracturing fluid between about 1 and about 40 percent in the fracturing fluid and where the microbubbles reduce a settling rate of the proppant in the fracturing fluid by hindering proppant settling, reducing proppant density, or forming microbubble coated proppant particles.

2. The method of claim 1, wherein the average size is between about 20 μ and about 5000 μ and the microbubble volume fraction is between about 1 percent and about 20 percent.

3. The method of claim 1, wherein the average size is between about 20 μ and about 4000 μ and the microbubble volume fraction is between about 1 percent and about 20 percent.

4. The method of claim 1, wherein the average size is between about 20 μ and about 3000 μ and the microbubble volume fraction is between about 1 percent and about 20 percent.

5. The method of claim 1, wherein the average size is between about 20 μ and about 2000 μ and the microbubble volume fraction is between about 1 percent and about 20 percent.

6. The method of claim 1, wherein the average size is between about 20 μ and about 1000 μ and the microbubble volume fraction is between about 1 percent and about 20percent.

7. The method of claim 1, wherein the single downhole location is upstream of the formation to be fractured.

8. The method of claim 1, wherein the single downhole location is just before the formation to be fractured.

9. The method of claim 1, wherein the single downhole location is a location within the formation to be fractured.

10. The method of claim 1, further comprising:
    injecting the gas at multiple downhole locations through nozzles, where the locations are upstream of and within the formation to be fractured, and
    changing the gas injection rate at each of the locations to produce the desired gasification profile.

11. The method of claim 1, further comprising:
    injecting the gas at multiple downhole locations through nozzles, where the locations are within the formation to be fractured, and
    changing the gas injection rate at each of the locations to produce the desired gasification profile.

12. A method for fracturing a formation comprising:
pumping a fracturing fluid into a formation to be fractured at a pressure sufficient to fracture the formation,
pumping a proppant-containing solution into the formation to be fractured,
during the pumping steps, after the pumping steps, or during and after the pumping steps, injecting a gas into the fracturing fluid at a gas injection rate below an amount sufficient to convert the fracturing fluid into a stable foam,
where the injecting occurs at a single downhole location producing gas microbubbles having an average size between about 10 and about 6000 micron ($\mu m$ or $\mu$) in the fracturing fluid, where the gasification profile is characterized by having a gas to fluid ratio of less than 20% and a microbubble volume fraction between about 1 and about 40 percent in the fracturing fluid, and where the microbubbles reduce a settling rate of the proppant in the fracturing fluid, reduce a density of the proppant in the fracturing fluid, or form microbubble coated particles having slower settling rates relative to particles without the microbubble coating,
monitoring a percent of the gas in the fracturing fluid at the single downhole location via a downhole sensor, and
changing the injection rate of the gas to achieve a desired gasification profile in the fracturing fluid across the formation to be fractured during fracturing.

13. The method of claim 12, wherein the average size is between about 20 $\mu$ and about 5000 $\mu$ and the microbubble volume fraction is between about 1 percent and about 20 percent.

14. The method of claim 12, wherein the average size is between about 20 $\mu$ and about 4000 $\mu$ and the microbubble volume fraction is between about 1 percent and about 20 percent.

15. The method of claim 12, wherein the average size is between about 20 $\mu$ and about 3000 $\mu$ and the microbubble volume fraction is between about 1 percent and about 20 percent.

16. The method of claim 12, wherein the average size is between about 20 $\mu$ and about 2000 $\mu$ and the microbubble volume fraction is between about 1 percent and about 20 percent.

17. The method of claim 12, wherein the average size is between about 20 $\mu$ and about 1000 $\mu$ and the microbubble volume fraction is between about 1 percent and about 20 percent.

18. The method of claim 12, wherein the single downhole location is upstream of the formation to be fractured.

19. The method of claim 12, wherein the single downhole location is just before the formation to be fractured.

20. The method of claim 12, wherein the single downhole location is a location within the formation to be fractured.

21. The method of claim 12, further comprising:
injecting the gas at multiple downhole locations, where the locations are upstream of and within the formation to be fractured and each location includes a sensor that measures a percent of the gas in the fracturing fluid at that location,
monitoring the percent gas in the fracturing fluid at each of the locations using the sensors, and
changing the injection rate of the gas at each of the locations based on the percentages of the gas measured at each of the locations to achieve the desired gasification profile.

22. The method of claim 12, further comprising:
injecting the gas at multiple downhole locations, where the locations are within the formation to be fractured and each of the locations includes a sensor that measures a percent of the gas in the fracturing fluid,
monitoring the percent gas in the fracturing fluid at each of the locations using the sensors, and
changing the injection rate of the gas at each of the locations based on the percentages of the gas measured at each of the locations to achieve the desired gasification profile.

* * * * *